United States Patent
Trainin et al.

(10) Patent No.: US 9,924,457 B2
(45) Date of Patent: Mar. 20, 2018

(54) APPARATUS AND PRODUCT OF POWER MANAGEMENT IN A WIRELESS NETWORK

(71) Applicant: INTEL IP CORPORATION, Santa Clara, CA (US)

(72) Inventors: Solomon B. Trainin, Haifa (IL); Carlos Cordeiro, Portland, OR (US); Michael Glik, Kfar Saba (IL); Oren Kedem, Modiin Maccabim-Reut (IL)

(73) Assignee: INTEL IP CORPORATION, Santa Clara, CA (US)

( * ) Notice: Subject to any disclaimer, the term of this patent is extended or adjusted under 35 U.S.C. 154(b) by 130 days.

(21) Appl. No.: 14/864,963

(22) Filed: Sep. 25, 2015

(65) Prior Publication Data

US 2016/0330682 A1 Nov. 10, 2016

Related U.S. Application Data

(60) Provisional application No. 62/157,539, filed on May 6, 2015, provisional application No. 62/159,294, filed on May 10, 2015.

(51) Int. Cl.
*H04W 52/02* (2009.01)
*H04W 52/18* (2009.01)

(52) U.S. Cl.
CPC ....... *H04W 52/0206* (2013.01); *H04W 52/18* (2013.01); *Y02B 60/50* (2013.01)

(58) Field of Classification Search
CPC ... H04W 52/0206; H04W 52/18; Y02B 60/50
See application file for complete search history.

(56) References Cited

U.S. PATENT DOCUMENTS

2006/0285528 A1* 12/2006 Gao .................. H04W 52/0229
370/338
2011/0225440 A1* 9/2011 Kwon ............... H04W 52/0235
713/323

(Continued)

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Omar Ghowrwal
(74) *Attorney, Agent, or Firm* — Shichrur & Co.

(57) ABSTRACT

Some demonstrative embodiments include apparatuses, devices, systems and methods of power management in a wireless network. For example, a first wireless station may be configured to transmit a frame to a second wireless station during a first beacon interval, the frame including an indication that the first wireless station is to switch to a low power mode; switch to the low power mode; operate at an active mode during an awake window in a second beacon interval subsequent to the first beacon interval; and upon receipt of an announcement traffic indication message (ATIM) from the second wireless station during the awake window, transmit an acknowledgement to the second wireless station, and stay at the active mode to communicate data with the second wireless station.

17 Claims, 5 Drawing Sheets

(56) References Cited

U.S. PATENT DOCUMENTS

2013/0095768 A1* 4/2013 Sinha ................ H04W 52/0235
455/70
2016/0174206 A1* 6/2016 Xia ...................... H04B 7/0491
370/329

OTHER PUBLICATIONS

IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

* cited by examiner

APPARATUS AND PRODUCT OF POWER MANAGEMENT IN A WIRELESS NETWORK

CROSS REFERENCE

This application claims the benefit of and priority from U.S. Provisional Patent Application No. 62/157,539 entitled "Apparatus, System and Method of Power Management in a Wireless Network", filed May 6, 2015, and U.S. Provisional Patent Application No. 62/159,294 entitled "Apparatus, System and Method of Power Management in a Wireless Network", filed May 10, 2015, the entire disclosures of both of which are incorporated herein by reference.

TECHNICAL FIELD

Embodiments described herein generally relate to power management in a wireless network.

BACKGROUND

Wireless communication stations (STAs) in a wireless communication network may utilize a power management mechanism.

The STAs may utilize a power management mechanism, for example, according to IEEE 802.11 ad-2012 ("IEEE P802.11 ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012).

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
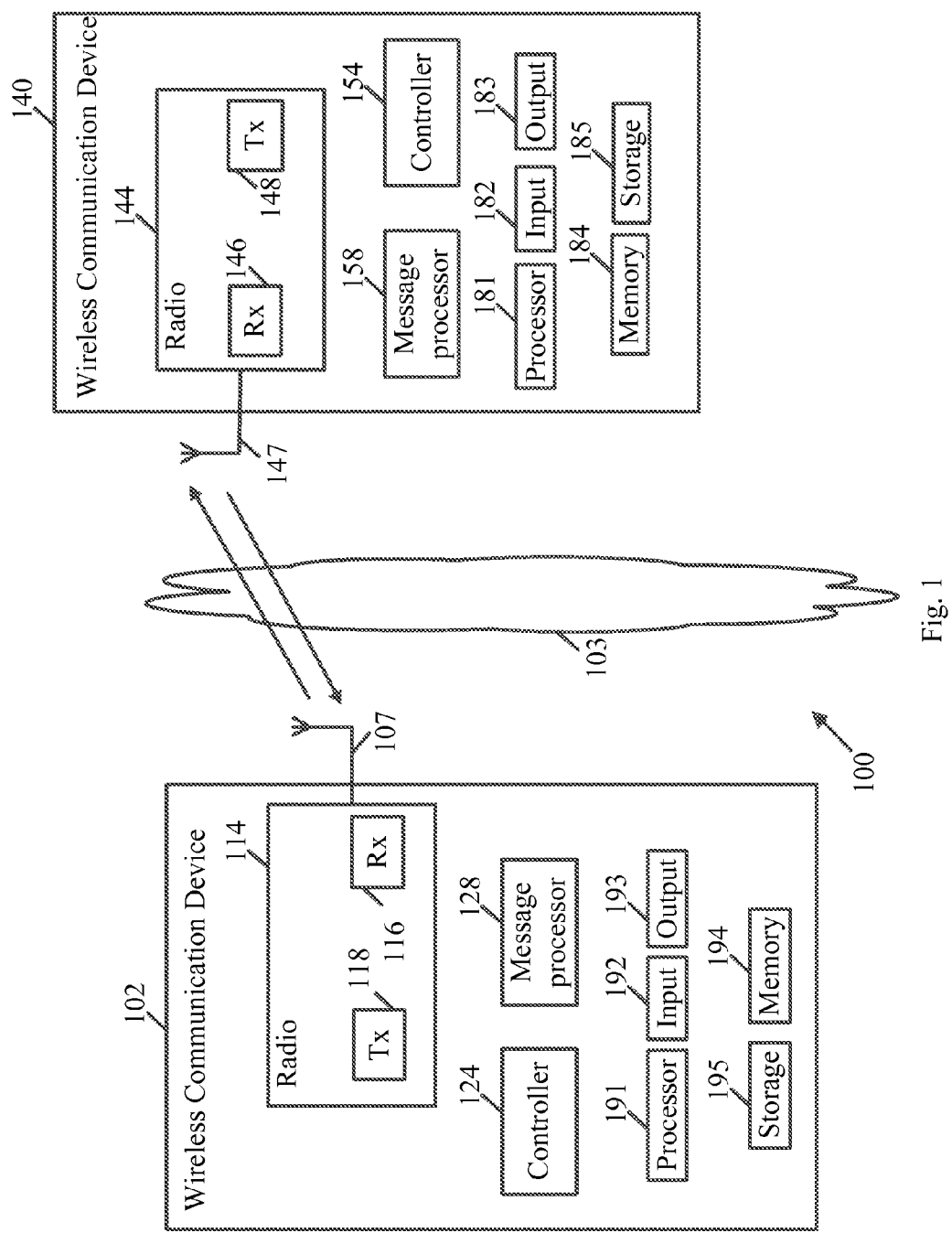
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, an Internet of Things (IoT) device, a sensor device, a wearable device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz"*, December, 2013); IEEE 802.11ad ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*", 28 Dec. 2012); IEEE-802.11REVmc ("*IEEE 802.11-REVmc™/ D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification*"); IEEE802.11-ay (*P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz*)) and/or other versions and/or derivatives thereof, devices and/or networks operating in accordance with existing Wireless-Gigabit-Alliance (WGA) specifications (*Wireless Gigabit Alliance, Inc WiGig MAC and PHY Specification Version 1.1, April 2011, Final specification*) and/or other versions and/or derivatives thereof, devices and/or networks operating in accordance with existing WIFI Alliance (WFA) Peer-to-Peer (P2P) specifications (*WIFI P2P technical specification, version 1.5, Aug. 4, 2015*) and/or other versions and/or derivatives thereof, devices and/or networks operating in accordance with existing cellular specifications and/or protocols, e.g., 3rd Generation Partnership Project (3GPP), 3GPP Long Term Evolution (LTE) and/or other versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), WIFI, Worldwide Interoperability for Microwave Access (WIMAX), ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Some demonstrative embodiments may be used in conjunction with a WLAN, e.g., a WIFI network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "mmWave STA (mSTA)"), which may include for example, a STA having a radio, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a BLU-RAY disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a WIFI channel, an IR channel, a BLUETOOTH (BT) channel, a Global Navigation Satellite System (GNSS) Channel, and the like.

In some demonstrative embodiments, WM 103 may include a directional channel. For example, WM 103 may include a millimeter-wave (mmWave) wireless communication channel.

In some demonstrative embodiments, WM 103 may include a DMG channel. In other embodiments, WM 103 may include any other additional or alternative directional channel.

In other embodiments, WM 103 may include any other type of channel over any other frequency band.

In some demonstrative embodiments, devices 102 and/or 140 may perform the functionality of one or more wireless stations, e.g., as described below.

In some demonstrative embodiments, devices 102 and/or 140 may perform the functionality of one or more DMG stations.

In other embodiments, devices 102 and/or 140 may perform the functionality of any other wireless device and/or station, e.g., a WLAN STA, a WIFI STA, and the like.

In some demonstrative embodiments, devices 102 and/or 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be steered to a plurality of beam directions.

In some demonstrative embodiments, device 102 may include a controller 124, and/or device 140 may include a controller 154. Controllers 124 and/or 154 may be configured to perform one or more communications, may generate and/or communicate one or more messages and/or transmissions, and/or may perform one or more functionalities, operations and/or procedures between devices 102 and/or 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, configured to cause, request and/or trigger a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, configured to cause, request and/or trigger a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below. In one example, message processor 128 may be configured to process transmission of one or more messages from a wireless station, e.g., a wireless STA implemented by device 102; and/or message processor 128 may be configured to process reception of one or more messages by a wireless station, e.g., a wireless STA implemented by device 102.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below. In one example, message processor 158 may be configured to process transmission of one or more messages from a wireless station, e.g., a wireless STA implemented by device 140; and/or message processor 158 may be configured to process reception of one or more messages by a wireless station, e.g., a wireless STA implemented by device 140.

In some demonstrative embodiments, message processors 128 and/or 158 may include circuitry, e.g., processor circuitry, memory circuitry, Media-Access Control (MAC) circuitry, Physical Layer (PHY) circuitry, and/or any other circuitry, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, at least part of the functionality of message processor 128 may be implemented as part of any other element of device 102, and/or at least part of the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a SoC. In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, devices 102 and/or 140 may be configured to operate as, and/or perform the functionality of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, devices 102 and/or 140 may be configured operate as, and/or perform the functionality of, a non-AP STA, e.g., a DMG non-AP STA, and/or a non-PCP STA, e.g., a DMG non-PCP STA, for example, a non-AP/PCP STA, e.g., a DMG non-AP/PCP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP and/or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

Some demonstrative embodiments may be implemented to perform power management of one or more stations, for example, in a DMG network and/or any other network, e.g., as described below.

In some demonstrative embodiments, one or more power management operations may be performed, for example, in accordance with an IEEE 802.11ad Specification, and/or any other specification, standard and/or protocol.

In some demonstrative embodiments, a STA, e.g., in a PBSS network, may be configured to be able to move to a low power mode, e.g., from an active mode, and to signal, indicate and/or inform one or more other STAs that the STA is to move from the active mode to the low power mode, or from the low power mode to the active mode.

In some demonstrative embodiments, the STA may use a power management PM bit or subfield to indicate whether the STA is to move from the active mode to the low power mode, or from the low power mode to the active mode, e.g., as described below. In other embodiments, any other additional or alternative indication may be used by the STA, e.g., any other bit, field, subfield, value, and/or information element, to indicate whether the STA is to move from the active mode to the low power mode, or from the low power mode to the active mode.

In some demonstrative embodiments, the STA may assert a PM subfield to a first value, e.g. "1", for example, in a control filed of a frame to another STA, e.g., any other STA, for example, to indicate that the STA is to move to the low power mode.

In some demonstrative embodiments, the STA may switch back to the active mode, for example, by sending, e.g., to the other STA, a frame with the PM subfield set to a second value, e.g., "0", for example, to indicate that the STA is to switch to the active mode.

In some demonstrative embodiments, a STA in a PBSS network may be allowed to setup a low power mode, for example, if an Awake Window Element (AWE) is included in beacons sent within the PBSS network, e.g., by a PCP STA.

Another solution of a power save mechanism, which may be based on the PM subfield, may be, for example, to setup a low power mode of a non-AP/non-PCP STA versus an AP STA. This solution may be, for example, well suited with a topology of an Infrastructure BSS, e.g., in the 2.4 GHz and/or 5 GHz frequency bands. For example, data, which may be communicated between non-AP STAs, may be bridged by an AP.

In some demonstrative embodiments, point-to-point (P2P or PTP) communication may be performed in a directive multi-gigabit (DMG) network, e.g., over a DMG band, for example, between non-AP/non-PCP stations, and/or between a non-AP/non-PCP station and a PCP/AP STA, e.g., within an infrastructure BSS and/or a PBSS network.

In some demonstrative embodiments, some power management solutions may be insufficient and/or may be ineffective in many networks, systems, scenarios, implementations, and/or use cases, for example, with respect to P2P communications within a DMG network. For example, such solutions may not allow peer STAs to establish a low power mode, e.g., in one or more use cases and/or scenarios.

Some demonstrative embodiments may be implemented, for example, to provide a solution to establish an unscheduled low power mode, for example, between stations, e.g., between point to point communicating stations, for example, non-PCP/AP STAs and/or PCP/AP STAs, e.g., in infrastructure BSS and/or PBSS.

Other embodiments may be implemented with respect to any other additional or alternative scenarios, implementations and/or networks, for example, to solve one or more additional or alternative technical problems, and/or to provide one or more additional or alternative benefits and/or improvements.

In some demonstrative embodiments, a selective unscheduled power management mechanism may be configured to use an indication field, for example, a PM field, for example, to set up a low power mode of a first station, for example, any station, e.g., a non-PCP/AP STA or a PCP STA, in relation to at least one second station, for example, any other station, e.g., a non-PCP/AP STA or a PCP/AP STA, for example, in a infrastructure BSS and/or PBSS and/or any other network, e.g., as described below.

In some demonstrative embodiments, a STA, e.g., a STA implemented by device 102, may be configured to switch to a low power mode, and to operate at an active mode during at least one awake window in one or more beacon intervals, e.g., as described below.

In some demonstrative embodiments, the STA, e.g., the STA implemented by device 102, may be configured to set the awake window, e.g., as described below.

In some demonstrative embodiments, the STA, e.g., the STA implemented by device 102, may be configured to advertise an awake window, for example, in a manner, which may prevent, avoid, mitigate and/or reduce, for example, mutual blockage of stations in the low power mode, e.g., as described below.

In other embodiments, the awake window may be set by another STA, for example, a PCP STA, e.g., as described below. For example, the STA, e.g., the STA implemented by device 102, may be configured to determine the awake window to be used by the STA based on a beacon from the PCP STA, e.g., as described below.

In one example, a STA may transmit to a PCP STA a frame including the PM bit set to indicate that the STA is to switch to the low power mode, and the PCP may set and advertize an awake window, e.g., in one or more beacons, based on and/or responsive to, the frame including the PM bit set to indicate that the STA is to switch to the low power mode, e.g., as described below.

In some demonstrative embodiments, a first STA, e.g., the STA implemented by device 102, for example, a non-AP/PCP STA, may be configured to indicate an Awake Window (AW) in one or more beacon intervals (BIs), e.g., as described below.

In some demonstrative embodiments, the first STA, e.g., the STA implemented by device 102, may be configured to indicate to at least one second STA, e.g., a STA implemented by device 140, for example, a non-AP/PCP STA or a PCP/AP STA, an AW during which the first STA is to be available, for example, to be woken up, for example, by an ATIM frame, e.g., as described below.

In some demonstrative embodiments, the first STA, e.g., the STA implemented by device 102, may be configured to send to the second STA, e.g., the STA implemented by device 140, a management frame including an AW element to indicate the AW in which the first STA will be available to be woken up, e.g., by the second STA.

In some demonstrative embodiments, the first STA, e.g., the STA implemented by device 102, may be configured to set up a low power mode, for example, using the management frame or another frame, e.g., by asserting the PM subfield to 1.

In some demonstrative embodiments, the second STA, e.g., the STA implemented by device 140, may be configured to process the received management frame from the first STA, and to acknowledge the management frame, for example, by sending an Acknowledgement (ACK) frame to the first STA, e.g., as described below.

In some demonstrative embodiments, the first STA, e.g., the STA implemented by device 102, may be configured to operate in the low power mode, and to be active to communicate one or more beacons, e.g., from a PCP STA, and within the awake window, e.g., as described below.

In some demonstrative embodiments, the second STA, e.g., the STA implemented by device 140, may be configured to send to the first STA an announcement traffic indication message (ATIM), for example, during the AW, e.g., indicated by the first STA, e.g., as described below.

In some demonstrative embodiments, the first STA, e.g., the STA implemented by device 102, may be configured to operate in the active mode, for example, upon receipt of the ATIM, for example, to communicate data with the second STA, e.g., as described below.

In some demonstrative embodiments, the first STA, e.g., the STA implemented by device 102, may receive the ATIM from the second STA, for example, during a first beacon interval (BI). The first STA may be active to communicate data with the second STA, and may switch to operate in the low power mode, for example, upon completing the communication of the data with the second STA.

In some demonstrative embodiments, the first STA may operate in the low power mode during a second BI, e.g., subsequent to the first BI, while, for example, being available to receive another ATIM, e.g., during the AW in the second BI.

Some demonstrative embodiments, e.g., as described herein, may allow, for example, efficient power saving by STAs, e.g., a non-PCP/AP STA and/or a PCP/AP STA.

Some demonstrative embodiments may be implemented, for example, with respect to communications between a non-PCP/AP STA and a PCP/AP STA, for example, to enable the PCP/AP STA to indicate to the non-PCP/AP STA that the non-PCP/AP STA is to switch from a low power mode to an active mode, e.g., as described below.

In some demonstrative embodiments, device 102 may be configured to operate as a PCP/AP STA, and/or device 140 may be configured to operate as a non-PCP/AP STA, e.g., as described below.

In some demonstrative embodiments, a non-PCP/AP STA may be configured to move to a low power mode, e.g., from an active mode. For example, the non-PCP/AP STA may assert a PM subfield to a first value, e.g., "1", for example, in a control filed of a frame to be sent to an AP/PCP STA, for example to indicate that the non-PCP/AP STA is to move to the low power mode. The non-PCP/AP STA may switch back to the active mode, for example, by sending to the AP/PCP STA a frame with the PM subfield set to a second value, e.g., "0", for example, to indicate that the non-PCP/AP STA is to switch to the active mode.

In some demonstrative embodiments, the PCP/AP STA, may buffer all frames directed to the non-PCP/AP STA, for example, when the non-PCP/AP STA is at the low power mode, e.g., if the AP/PCP STA is not be allowed to transmit data to the non-PCP/AP STA, when the non-PCP/PA STA is in the low power mode.

In some demonstrative embodiments, it may not be efficient to require the PCP/AP STA to buffer data for the non-PCP/AP STA, for example, without allowing the PCP/AP ST to request, cause, trigger, and/or force the non-PCP/AP STA to switch back to the active mode, e.g., when the PCP/AP STA has data to be sent to the non-PCP/AP STA.

For example, internal buffers of the AP/PCP may be overloaded and, as a result, undelivered data may be lost, for example, if the AP/PCP STA cannot request, cause, trigger, and/or force a STA in low power mode to switch back to the active mode, for example, when frames are buffered for the STA in the PCP/AP STA.

In some demonstrative embodiments, it may not be sufficient, for example, to allow the PCP/AP STA to indicate to the STA that some data is collected in the AP/PCP. For example, such an indication may not be enough, for example, to cause, trigger, or force the STA to switch back to the active mode.

In some demonstrative embodiments, an AP/PCP STA, e.g., a STA implemented by device 102, may be configured to advertise an Awake Window (AW) in one or more beacon intervals (BIs), e.g., as described below.

In some demonstrative embodiments, an AP/PCP STA, e.g., device 102, that acknowledges a frame with the PM subfield set to "1", may advertise an awake window (AW) in a BI, for example, in each beacon interval (BI), that follows the BI the frame with the PM subfield set to one was acknowledged.

In some demonstrative embodiments, the AP/PCP STA, e.g., the STA implemented by device 102, may be configured to advertize the AW, for example, by including an AW element in one or more beacons, e.g., in each of the beacons.

In some demonstrative embodiments, a STA, for example, a non-AP/PCP STA, e.g., a STA implemented by device 140, which is in the low power mode, shall be wake within the awake window and a remainder of the BI, for example, if the STA receives a message, e.g., an announcement traffic indication message (ATIM), from the AP/PCP STA, e.g., as described below.

Some demonstrative embodiments, e.g., as described herein, may allow, for example, efficient power saving by the non-AP/non-PCP STA, for example, while allowing improved, e.g., optimal, buffer management in the AP/PCP STA, e.g., to avoid, mitigate and/or prevent buffer overflow and/or missing of data.

Some demonstrative embodiments, e.g., as described herein, may allow, for example, improved power saving of one or more stations, for example, in networks implementing contention based access.

In some demonstrative embodiments, controller 124 may be configured to cause a first wireless station, e.g., a STA implemented by device 102, to transmit a frame to a second wireless station, e.g., a STA implemented by device 140, during a first beacon interval.

In some demonstrative embodiments, the frame may include an indication that the first wireless station is to switch to a low power mode. For example, message processor 128 may generate the frame including a control filed, which may include a PM bit set to the value "1", e.g., as described above.

In some demonstrative embodiments, controller 154 may cause a second wireless station, e.g., a STA implemented by device 140, to process the frame received from the first wireless station during the first beacon interval.

In some demonstrative embodiments, controller 154 may cause the second wireless station to respond to the frame, for example, by transmitting an Acknowledge (ACK) frame, and controller 124 may cause the first wireless station to process the received ACK frame.

In some demonstrative embodiments, controller 124 may cause the first wireless station to switch to the low power mode. In one example, controller 124 may trigger powering down of one or more elements of device 102, e.g., radio 114, transmitter 118 and/or receiver 116.

In some demonstrative embodiments, controller 124 may cause the first wireless station to switch to the low power mode, for example, after receipt of the ACK frame from the second wireless station.

In some demonstrative embodiments, controller 124 may cause the first wireless station to operate at an active mode during an awake window in a second beacon interval subsequent to the first beacon interval. In one example, controller 124 may trigger powering up one or more of the elements of device 102, e.g., radio 114, transmitter 118 and/or receiver 116, which were powered down.

In some demonstrative embodiments, controller 154 may cause the second wireless station to transmit an announcement traffic indication message (ATIM) to the first wireless station during the awake window in the second beacon interval, for example, to indicate data is pending for the first wireless station.

In some demonstrative embodiments, controller 124 may cause the first wireless station to transmit an acknowledgement to the second wireless station, for example, upon receipt of the ATIM from the second wireless station during the awake window. For example, controller 124 may trigger transmitter 118 to transmit an ACK message to acknowledge the ATIM message.

In some demonstrative embodiments, controller 124 may cause the first wireless station to stay at the active mode to communicate data with the second wireless station, for example, after transmitting the acknowledgement.

In some demonstrative embodiments, controller 154 may cause the second wireless station to transmit one or more data frames to the first wireless station after the awake window and during the second beacon interval, for example, upon receipt of an acknowledgement from the first wireless station.

In some demonstrative embodiments, the awake window may be defined, set and/or determined by the first wireless station. For example, controller 124 may be configured to determine the awake window.

In some demonstrative embodiments, controller 124 may be configured to cause the first wireless station to advertize the awake window, e.g., at least to the second wireless station.

In some demonstrative embodiments, controller 124 may be configured to cause the first wireless station to generate the frame including the indication that the first wireless station is to switch to the low power mode, and also including an awake window (AW) element to indicate the awake window, e.g., as described below with reference to FIG. 2. According to these embodiments, controller 154 may be configured to determine the awake window, for example, based on the AW element in the frame including the indication that the first wireless station is to switch to the low power mode.

In some demonstrative embodiments, the awake window may be defined, set and/or determined by a PCP/AP station. For example, controller 124 may control the first wireless station to operate as a non-PCP/AP STA, and to determine the awake window according to an awake window (AW) element received in a beacon from the PCP/AP station, e.g., as described below with reference to FIG. 3.

In some demonstrative embodiments, the PCP may be configured to include the AW element in the beacon, for example, based on receipt of an indication from a STA that the STA is to switch to the low power mode, e.g., as described below.

In some demonstrative embodiments, the second wireless station may operate as the PCP/AP STA. For example, controller 154 may cause the second wireless station to transmit beacons including the AW element defining the awake window, e.g., as described below with reference to FIG. 3.

In some demonstrative embodiments, controller 124 may be configured to cause the first wireless station to return to the low power mode, for example, after the awake window, e.g., for a remainder of the second beacon interval, for example, if the first wireless station does not receive any ATIM during the awake window.

In some demonstrative embodiments, controller 124 may be configured to cause the first wireless station to assert an end of service period (EOSP) indication in a transmission to the second wireless station, for example, during the second beacon interval, and to return to the low power mode, e.g., as described below with reference to FIGS. 2 and/or 3.

In some demonstrative embodiments, controller 154 may be configured to cause the second wireless station to process the transmission including the EOSP indication, and to determine that the first wireless station is to return to the low power mode, e.g., as described below with reference to FIGS. 2 and/or 3.

In some demonstrative embodiments, controller 124 may be configured to cause the first wireless station to continue to operate at the low power mode during one or more subsequent beacon intervals. For example, controller 124 may be configured to cause the first wireless station to operate at the low power mode during a third beacon interval subsequent to the second beacon interval, e.g., as described below with reference to FIGS. 2 and/or 3.

In some demonstrative embodiments, controller 124 may be configured to cause the first wireless station to switch back to the active mode, e.g., during a beacon interval, and to remain in the active mode, for example, during at least part of a remainder of the beacon interval and, optionally, one or more subsequent beacon intervals, for example, as long as the first wireless station does not transmit an indication that the first wireless station is to switch again to the low power mode.

In some demonstrative embodiments, controller 124 may be configured to cause the first wireless station to transmit during the second beacon interval another frame including an indication that the first wireless station is to switch to the active mode. For example, controller 124 may be configured to cause the first wireless station to transmit a frame including the PM bit set to "0", and to switch to the active mode, e.g., as described below with reference to FIGS. 2 and/or 3.

In some demonstrative embodiments, upon receiving the indication that the first wireless station is to switch back to the active state, controller 154 may allow the first wireless station to transmit data to the first wireless station during one or more subsequent beacon intervals, e.g., without sending an ATIM to the first wireless station.

For example, upon receipt of a transmission from the first wireless station during the second beacon interval indicating that the first wireless station is to switch to the active mode, controller 154 may allow the second wireless station to transmit data to the first wireless station during a third beacon interval subsequent to the second beacon interval, e.g., without sending an ATIM to the second wireless station.

Figure 2:
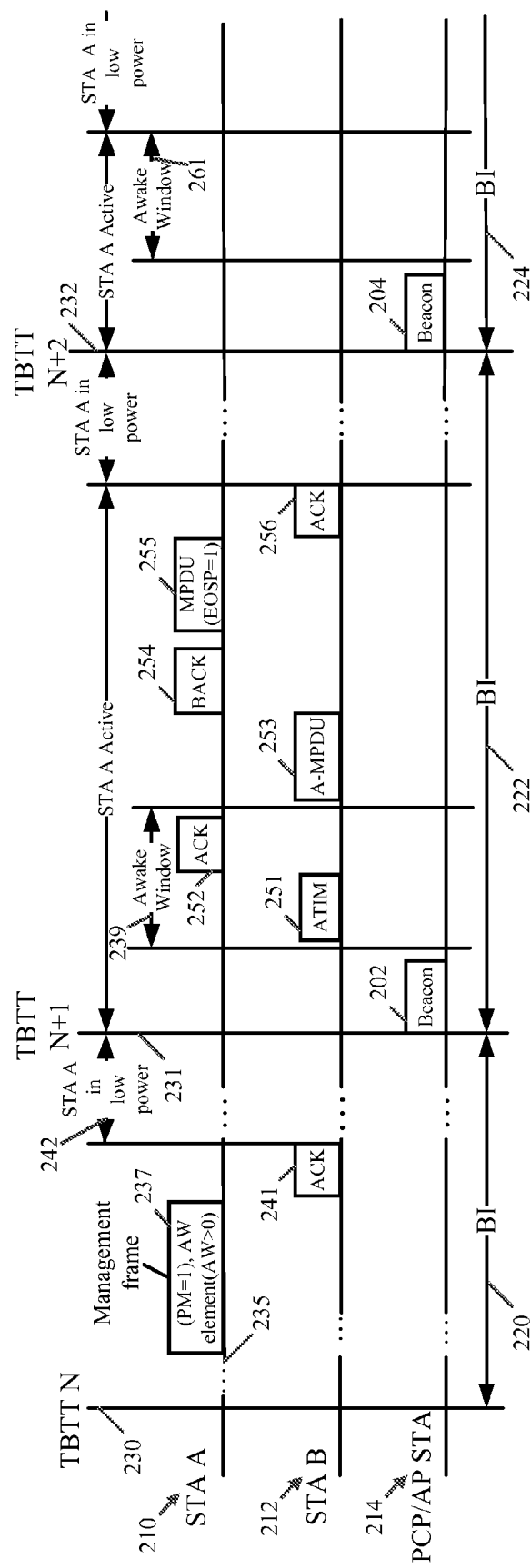
FIG. 2 is a schematic illustration of communications between stations, in accordance with some demonstrative embodiments.

Reference is made to FIG. 2, which schematically illustrates communications between stations, in accordance with some demonstrative embodiments.

In some demonstrative embodiments, as shown in FIG. 2, a first STA ("STA A") 210 may communicate with a second STA ("STA B") 212. For example, device 102 (FIG. 1) may perform the functionality of the STA A 210, and/or device 140 (FIG. 1) may perform the functionality of the STA B 212.

In some demonstrative embodiments, as shown in FIG. 2, the STA A 210 and the STA B 212 may communicate during one or more beacon intervals, for example, according to one or more beacons, e.g., including beacons 202 and/or 204, transmitted by a PCP/AP STA 214. For example, the PCP/AP STA 214 may control a BSS or PBSS, which may include the STA A 210, and/or the STA B 212.

In some demonstrative embodiments, the STA A 210 may be a first non-PCP/AP STA, and the STA B 212 may be a second non-PCP/AP STA. According to these embodiments, the PCP/AP STA 214 may be another STA.

In some demonstrative embodiments, the STA A 210 may operate as a PCP STA 214, and the STA B 212 may be a non-PCP/AP STA. According to these embodiments, the beacons 202 and 204 may be transmitted by the STA A 210.

In some demonstrative embodiments, the STA B 212 may operate as a PCP STA 214, and the STA A 210 may be a non-PCP/AP STA. According to these embodiments, the beacons 202 and 204 may be transmitted by the STA B 212.

In some demonstrative embodiments, as shown in FIG. 2, the STA A 210 may be in an active mode and may be ready to exchange frames with the STA B 212 in a first BI 220, for example, from a Target Beacon Transmission Time (TBTT) ("TBTT (N)") until a subsequent TBTT ("TBTT (N+1)").

In some demonstrative embodiments, as shown in FIG. 2, at some point of time 235 within the first BI, the STA A 210 may want to move to a low power mode.

In some demonstrative embodiments, the STA A 210 may be configured to be responsible to provide to the STA B 212 an indication of an awake window 239, in which the STA A 210 may be available to be woken up, e.g., with an ATIM frame.

In some demonstrative embodiments, for example, if an AW element is already included in beacons 202 and/or 204 sent by the AP/PCP STA 214 of the BSS to which the STA A 21 belongs, the STA A 210 may adopt an existing AW and shall be awake during the AW advertized by the beacons (not shown in FIG. 2).

In some demonstrative embodiments, for example, if there is no AW element in the beacons 202 and/or 204, the STA A 210 shall deliver an AW element to the station, e.g., STA B 212, with which the STA A 210 is to establish the low power mode.

In some demonstrative embodiments, as shown in FIG. 2, the STA A 210 may send to the STA B 212 a management frame 237 to covey the AW element of STA A 210.

In some demonstrative embodiments, as shown in FIG. 2, the STA A 210 may use a frame, e.g., the same management frame 237, which includes the AW element, to set up the low power mode, for example, by assertion of the PM subfield in frame 237 to 1.

In some demonstrative embodiments, as shown in FIG. 2, the STA B 212 may process the management frame 237 received from the STA A 210, and may send an acknowledgement (ACK) 241 to the STA A 210. The STA A 210 may receive the ACK 241.

In some demonstrative embodiments, for example, if the STA A 210 operates as the PCP STA, the STA A 210 may include the AW element in a beacon, for example, a beacon (not shown in FIG. 2) transmitted at TBTT N or the beacon 202. According to these embodiments, the STA A 210 may be active in awake window 239, for example, after sending to the STA B 212 a frame with the PM subfield set to 1.

In some demonstrative embodiments, as shown in FIG. 2, the STA A 210 may switch to a low power mode for a time period 242, for example, during the first BI, e.g., upon or after receiving the ACK 241. For example, as shown in FIG. 2, the STA A 210 may remain in the low power mode for a remainder of the BI 220.

In some demonstrative embodiments, as shown in FIG. 2, when in the low power mode, the STA A 210 may be active to communicate, e.g., receive, at least some of the beacons, and within an awake window, e.g. the awake window 239 indicated by the STA A 210 to the STA B 212 or the awake window advertized by the beacons.

In some demonstrative embodiments, as shown in FIG. 2, in a second BI 222, e.g., subsequent to the first BI 220, for example, from the TBTT (N+1) 231 until a subsequent TBTT ("TBTT (N+2)") 232, the STA A 210 may be active, for example, during the beacon transmission time of beacon 202 and within the awake window 239.

In some demonstrative embodiments, as shown in FIG. 2, the STA B 212 may deliver an ATIM 251 to the STA A 210, for example, within the awake window 239, for example, to indicate to the STA A 210 that the STA A 210 is to switch to the active mode.

In some demonstrative embodiments, as shown in FIG. 2, the STA A 210 may process receipt of the ATIM 251 in the awake window 239, and may acknowledge the ATIM by transmitting an ACK 252.

In some demonstrative embodiments, as shown in FIG. 2, the STA A 210 may be active, for example, after acknowledging the ATIM 251, in the current BI, e.g., in the second BI 222, and may exchange data with the STA B 212, e.g., in one or both directions, for example, by communicating one or more data units, e.g., including at least one Aggregate Media Access Control (MAC) Protocol Data Unit (MPDU) (A-MPDU) 253, and/or one or more acknowledgements, e.g., including at least one Block ACK (BACK) 254.

In some demonstrative embodiments, as shown in FIG. 2, the STA A 210 may indicate that the STA A 210 is to switch back to the low power mode, for example, by asserting an end of service period (EOSP) indication in a Media Access Control (MAC) Protocol Data Unit (MPDU) 255 to be sent from the STA A 210 to the STA B 212.

In some demonstrative embodiments, as shown in FIG. 2, the STA A 210 may select to continue to stay in the low power mode, for example, while waking up for beacons, e.g., beacon 204 in a third BI 224, and awake windows, e.g., an awake window 261 in the BI 224.

In some demonstrative embodiments, the STA A 210 may select to stay active, for example, during the BI, e.g., the BI 222, in which the ATIM frame from the STA B, e.g., ATIM 251, is received. The STA A 210 may switch back to the low power mode, for example, in the following BIs, e.g., in BI 224.

In some demonstrative embodiments, the STA A 210 may select, for example, not to issue the EOSP, e.g., if the STA A 210 selects to stay active, for example, during the remainder of BI 222.

In some demonstrative embodiments, the STA A 210 may switch back to the active mode, for example, by sending to the STA B 212 a frame with the PM subfield set to "0" (not shown in FIG. 2).

In some demonstrative embodiments, the STA A 210 may switch between the active mode and the low power mode one or more times during the same BI, for example, by sending a frame including the PM bit set to the value "1" to indicate the STA A 210 is to switch to the low power mode, and/or by sending a frame including the PM bit set to the value "0" to indicate the STA A 210 is to switch to the active mode.

Figure 3:
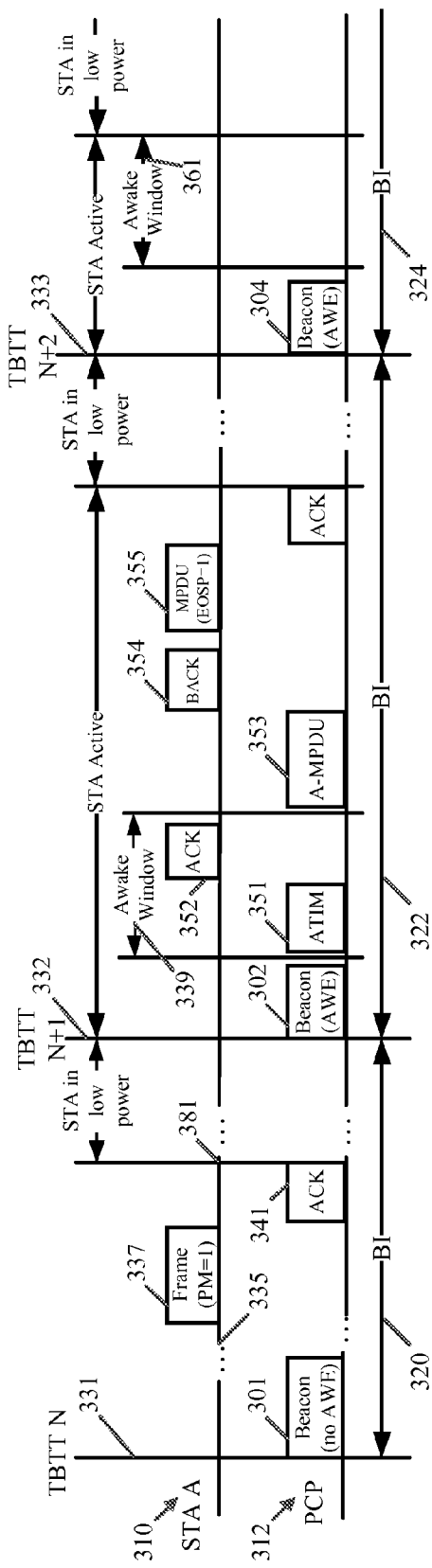
FIG. 3 is a schematic illustration of communications between stations, in accordance with some demonstrative embodiments.

Reference is made to FIG. 3, which schematically illustrates communications between stations, in accordance with some demonstrative embodiments.

In some demonstrative embodiments, as shown in FIG. 3, a PCP/AP STA 312 (denoted "PCP" in FIG. 3) may communicate with a STA ("STA A") 310, e.g., a non-AP/PCP STA 312. In one example, device 102 (FIG. 1) may perform the functionality of the PCP/AP STA 312, and/or device 140 (FIG. 1) may perform the functionality of the STA 310.

In some demonstrative embodiments, as shown in FIG. 3, the STA A 310 may be in an active mode and may be ready to exchange frames with the PCP 312 in a first BI 320, for example, from a Target Beacon Transmission Time (TBTT) ("TBTT (N)") 331 until a subsequent TBTT ("TBTT(N+1)") 332.

In some demonstrative embodiments, as shown in FIG. 3, at some point of time 335 within the first BI 320, the STA A 310 may transmit to the PCP 312 a frame 337 with the PM subfield set to 1, for example, to indicate that the and the STA A 310 is to switch to a low power mode, e.g., as described above.

In some demonstrative embodiments, the PCP 312 may transmit to the STA A 310 an acknowledgement (ACK) 341 to acknowledge the frame 337.

In some demonstrative embodiments, as shown in FIG. 3, the STA A 310 may switch to a low power mode at a time 381, for example, during the first BI 320, e.g., upon or after receiving the ACK 341.

In some demonstrative embodiments, as shown in FIG. 3, when in the low power mode, the STA A 310 may be active to receive at least some of the beacons from the PCP 312, e.g., including beacons 302 and/or 304.

In some demonstrative embodiments, as shown in FIG. 3, when in the low power mode, the STA A 310 may be active within an awake window in a BI, which may be defined by a beacon at the beginning of the BI, e.g., as described below.

In some demonstrative embodiments, as shown in FIG. 3, in a second BI 322, e.g., subsequent to the first BI 320, for example, from the TBTT (N+1) 332 until a subsequent TBTT ("TBTT (N+2)") 333, the PCP 312 may convey an awake window element (AWE), for example, in the beacon 302 that advertises the BI 322 to include an awake window 339.

In some demonstrative embodiments, the PCP 312 may be configured to include the AWE to advertize the awake window 339, for example, based on and/or triggered by the PM subfield of frame 337 indicating that the STA A 310 is to switch to a low power mode. For example, as shown in FIG. 3, the PCP 312 may transmit a beacon 301, which does not include the AWE, for example, prior to receiving the frame 337 indicating that the STA A 310 is to switch to a low power mode. For example, the PCP 312 may transmit beacons, e.g., beacons 302 and 304, including the AWE, for example, as long as no indication is received from the STA A 310 to indicate that the STA A 310 is to switch back to the active mode.

In some demonstrative embodiments, as shown in FIG. 3, the STA A 310 may obtain the AWE from the beacon 302, and may be active within the awake window 339.

In some demonstrative embodiments, as shown in FIG. 3, the PCP 312 may deliver an ATIM 351 to the STA A 310, for example, within the awake window 339. The PCP 312 may transit the ATIM 351, for example, to indicate to the STA A 310 that the STA A 310 is to switch to the active mode. For example, PCP 312 may be configured to send the ATIM 351, when PCP 312 has data pending transmission to the STA A 310.

In some demonstrative embodiments, as shown in FIG. 3, the STA A 310 may receive the ATIM 351 in the awake window 339, and may acknowledge the ATIM 351, for example, by transmitting an ACK 352.

In some demonstrative embodiments, as shown in FIG. 3, the STA A 310 may be active, for example, after acknowledging the ATIM 351, in the current BI, e.g., in the second BI 322.

In some demonstrative embodiments, as shown in FIG. 3, the PCP 312 may receive the ACK 352, and may transmit one or more data units to the STA A 310, e.g., after receiving ACK 352. For example, as shown in FIG. 3, the PCP 312 may exchange data with the STA A 310, e.g., in one or both directions, for example, by communicating one or more data units, e.g., including at least one Aggregate Media Access Control (MAC) Protocol Data Unit (MPDU) (A-MPDU) 353, and/or one or more acknowledgements, e.g., including at least one Block ACK (BACK) 354.

In some demonstrative embodiments, as shown in FIG. 3, the STA A 310 may indicate to PCP 312 that the STA A 310 is to switch back to the low power mode, for example, by asserting an end of service period (EOSP) indication in a Media Access Control (MAC) Protocol Data Unit (MPDU) 355 to be sent from the STA A 310 to the PCP 312.

In some demonstrative embodiments, as shown in FIG. 3, the STA A 310 may select to continue to stay in the low power mode, for example, while waking up for beacons, e.g., beacon 304 in a third BI 324, and awake windows, e.g., an awake window 361 in the BI 324.

In some demonstrative embodiments, the STA A 310 may select to stay active, for example, during the BI, e.g., the BI 322, in which the ATIM frame from the PCP 312, e.g., ATIM 351, is received. The STA A 310 may switch back to the low power mode, for example, in the following BIs, e.g., in BI 324.

In some demonstrative embodiments, the STA A 310 may select, for example, not to issue the EOSP, e.g., if the STA A 310 selects to stay active, for example, during the remainder of BI 322.

In some demonstrative embodiments, the STA A 310 may switch back to the active mode, for example, by sending to the PCP 312 a frame with the PM subfield set to "0" (not shown in FIG. 3).

In some demonstrative embodiments, the STA A 310 may switch between the active mode and the low power mode one or more times during the same BI, for example, by sending a frame including the PM bit set to the value "0" to indicate the STA A 310 is to switch to the active mode, and/or by sending a frame including the PM bit set to the value "1" to indicate that the STA A 310 is to switch from the active mode to the low power mode.

Figure 4:
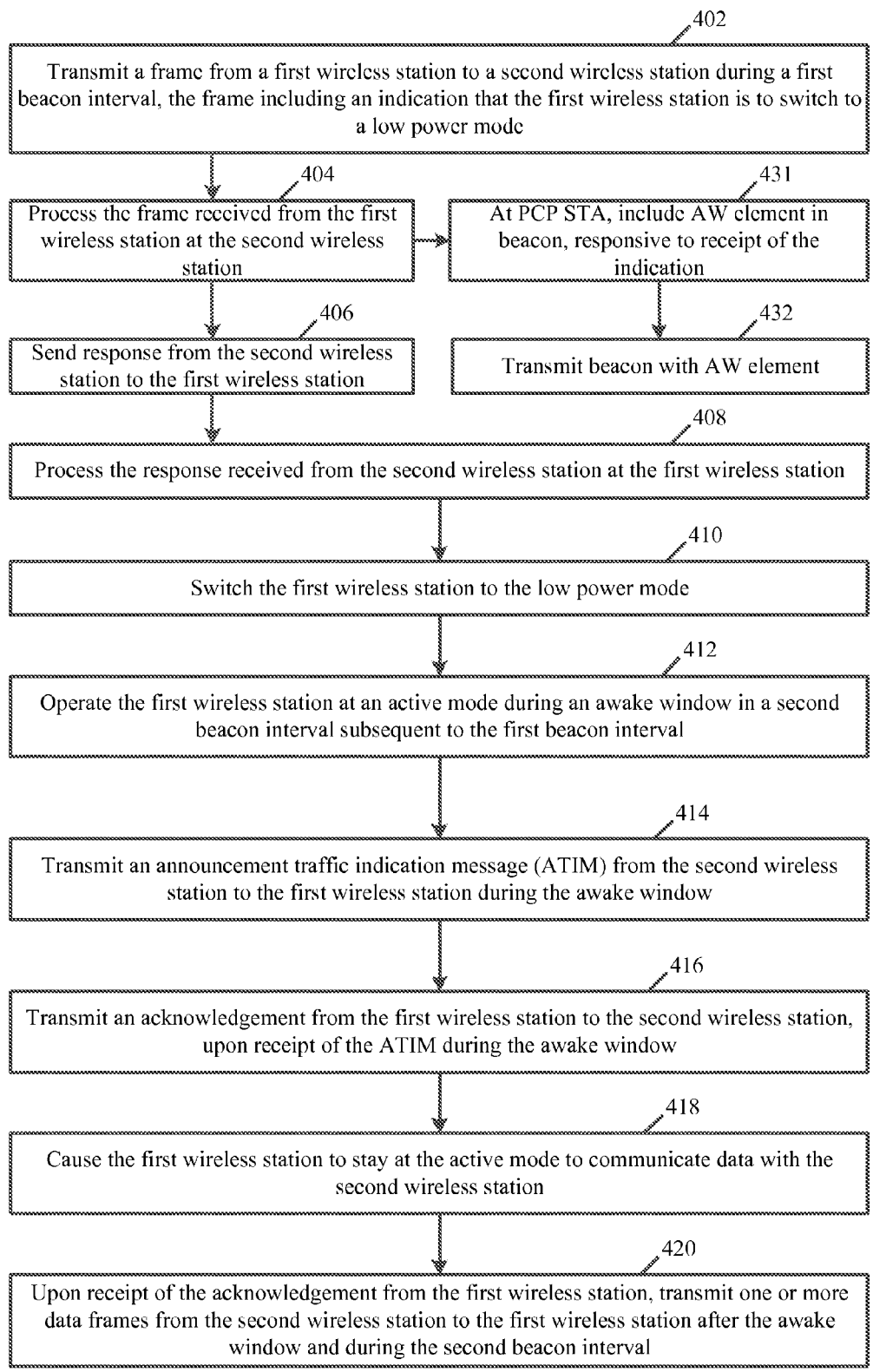
FIG. 4 is a schematic flow-chart illustration of a method of power management, in accordance with some demonstrative embodiments.

Reference is made to FIG. 4, which schematically illustrates a method of power management, in accordance with some demonstrative embodiments. For example, one or more of the operations of the method of FIG. 4 may be performed by one or more elements of a system, e.g., system 100 (FIG. 1), for example, one or more wireless devices, e.g., device 102 (FIG. 1) and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 402, the method may include transmitting a frame from a first wireless station to a second wireless station during a first beacon interval, the frame including an indication that the first wireless station is to switch to a low power mode. For example, controller 124 (FIG. 1) may trigger message processor 128 (FIG. 1) to generate a frame including the PM subfield set to the value "1", and controller 124 (FIG. 1) may trigger radio 114 (FIG. 1) to transmit the frame to device 140 (FIG. 1), e.g., as described above.

As indicated at block 404, the method may include processing the frame received from the first wireless station at the second wireless station. For example, controller 154 (FIG. 1) may trigger message processor 158 (FIG. 1) to process the frame from device 102 (FIG. 1).

As indicated at block 431, the method may include, at a PCP STA, including an AW element in a beacon, upon receipt of the indication that the first wireless station is to switch to the low power mode. For example, PCP STA 214 (FIG. 2) may include the AW element in one or more beacons, for example, upon receipt of a frame including the PM bit set to 1, e.g., as described above.

As indicated at block 432, the method may include transmitting the beacon including the AW element, for example, during one or more subsequent beacon intervals. For example, PCP STA 214 (FIG. 2) may transmit one or more beacons including the AW element, e.g., as described above.

As indicated at block 406, the method may include sending response from the second wireless station to the first wireless station. For example, controller 154 (FIG. 1) may trigger radio 144 (FIG. 1) to transmit an ACK frame in response to the frame from device 102 (FIG. 1), e.g., as described above.

As indicated at block 408, the method may include processing the response received from the second wireless station at the first wireless station. For example, controller 124 (FIG. 1) may trigger message processor 124 (FIG. 1) to process the response from device 140 (FIG. 1).

As indicated at block 410, the method may include switching the first wireless station to the low power mode. For example, controller 124 (FIG. 1) may trigger device 102 to switch to the low power mode, for example, upon receipt of the response, e.g., as described above.

As indicated at block 412, the method may include operating the first wireless station at an active mode during an awake window in a second beacon interval subsequent to the first beacon interval. For example, controller 124 (FIG. 1) may trigger device 102 (FIG. 1) to operate in the active mode during the awake window, e.g., as described above.

As indicated at block 414, the method may include transmitting an announcement traffic indication message (ATIM) from the second wireless station to the first wireless station during the awake window. For example, controller 154 (FIG. 1) may trigger radio 144 (FIG. 1) to transmit an ATIM frame in the awake window, for example, to indicate data is pending for device 102 (FIG. 1), e.g., as described above.

As indicated at block 416, the method may include transmitting an acknowledgement from the first wireless station to the second wireless station, for example, upon receipt of the ATIM during the awake window. For example, controller 124 (FIG. 1) may trigger radio 114 (FIG. 1) to transmit an ACK to device 140 (FIG. 1), for example, in response to the ATIM, e.g., as described above.

As indicated at block 418, the method may include causing the first wireless station to stay at the active mode to communicate data with the second wireless station. For example, controller 124 (FIG. 1) may cause device 102 (FIG. 1) to stay at the active mode to communicate with device 140 (FIG. 1), for example, after acknowledging the ATIM, e.g., as described above.

As indicated at block 420, the method may include upon receipt of the acknowledgement from the first wireless station, transmitting one or more data frames from the second wireless station to the first wireless station after the awake window and during the second beacon interval. For example, controller 154 (FIG. 1) may trigger device 140 (FIG. 1) to communicate with device 102 (FIG. 1), for example, upon receipt of the ACK from device 102 (FIG. 1), e.g., as described above.

Figure 5:
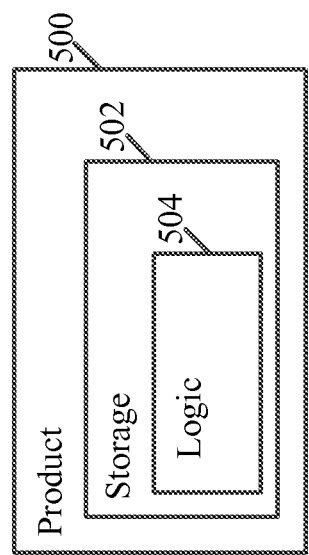
FIG. 5 is a schematic illustration of a product of manufacture, in accordance with some demonstrative embodiments.

Reference is made to FIG. 5, which schematically illustrates a product of manufacture 500, in accordance with some demonstrative embodiments. Product 500 may include a non-transitory machine-readable storage medium 502 to store logic 504, which may be used, for example, to perform at least part of the functionality of device 102 (FIG. 1), device 140 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processors 128 (FIG. 1), and/or message processor 158 (FIG. 1) and/or to perform one or more operations, e.g., as described above with reference to FIGS. 2, 3, and/or 4. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Examples

The following examples pertain to further embodiments.

Example 1 includes an apparatus comprising circuitry configured to cause a first wireless station to transmit a frame to a second wireless station during a first beacon interval, the frame comprising an indication that the first wireless station is to switch to a low power mode; switch to the low power mode; operate at an active mode during an awake window in a second beacon interval subsequent to the first beacon interval; and upon receipt of an announcement traffic indication message (ATIM) from the second wireless station during the awake window, transmit an acknowledgement to the second wireless station, and stay at the active mode to communicate data with the second wireless station.

Example 2 includes the subject matter of Example 1, and optionally, wherein the apparatus is configured to cause the first wireless station to return to the low power mode after the awake window for a remainder of the second beacon interval, if no ATIM is received by the first wireless station during the awake window.

Example 3 includes the subject matter of Example 1 or 2, and optionally, wherein the apparatus is configured to cause the first wireless station to switch to the power save mode after receipt of an acknowledgement of the frame.

Example 4 includes the subject matter of any one of Examples 1-3, and optionally, wherein the frame comprises an awake window (AW) element to indicate the awake window.

Example 5 includes the subject matter of any one of Examples 1-4, and optionally, wherein the apparatus is configured to cause the first wireless station to determine the awake window according to an awake window (AW) element received in a beacon.

Example 6 includes the subject matter of any one of Examples 1-5, and optionally, wherein the apparatus is configured to cause the first wireless station to assert an end of service period (EOSP) indication in a transmission to the second wireless station during the second beacon interval, and to return to the low power mode.

Example 7 includes the subject matter of any one of Examples 1-6, and optionally, wherein the apparatus is configured to cause the first wireless station to transmit during the second beacon interval another frame comprising an indication that the first wireless station is to switch to the active mode, and to switch to the active mode.

Example 8 includes the subject matter of any one of Examples 1-7, and optionally, wherein the apparatus is configured to cause the first wireless station to operate at the low power mode during a third beacon interval subsequent to the second beacon interval.

Example 9 includes the subject matter of any one of Examples 1-8, and optionally, wherein the indication that the first wireless station is to switch to the low power mode comprises a power management bit having a value of one.

Example 10 includes the subject matter of any one of Examples 1-9, and optionally, wherein the first wireless station is a Direct Multi Gigabit (DMG) station (STA).

Example 11 includes the subject matter of any one of Examples 1-10, and optionally, wherein the first wireless station is a non Personal Basic Service Set (PBSS) Control Point (PCP) and non Access Point (AP) (non-PCP/AP) station (STA).

Example 12 includes the subject matter of Example 11, and optionally, wherein the second wireless station is a PCP or AP (PCP/AP) station (STA).

Example 13 includes the subject matter of Example 11, and optionally, wherein the second wireless station is a non-PCP/AP STA.

Example 14 includes the subject matter of any one of Examples 1-10, and optionally, wherein the first wireless station is a Personal Basic Service Set (PBSS) Control Point (PCP) station (STA).

Example 15 includes the subject matter of any one of Examples 1-14, and optionally, comprising a transmitter to transmit the frame, and a receiver to receive the ATIM.

Example 16 includes the subject matter of any one of Examples 1-15, and optionally, comprising one or more antennas, a processor, and a memory.

Example 17 includes a system of wireless communication comprising a first wireless station, the first wireless station comprising one or more antennas; a processor; a memory; and a radio to transmit a frame to a second wireless station during a first beacon interval, the frame comprising an indication that the first wireless station is to switch to a low power mode, to switch to the low power mode, to operate at an active mode during an awake window in a second beacon interval subsequent to the first beacon interval, and, upon receipt of an announcement traffic indication message (ATIM) from the second wireless station during the awake window, to transmit an acknowledgement to the second wireless station, and to stay at the active mode to communicate data with the second wireless station.

Example 18 includes the subject matter of Example 17, and optionally, wherein the first wireless station is configured to return to the low power mode after the awake window for a remainder of the second beacon interval, if no ATIM is received by the first wireless station during the awake window.

Example 19 includes the subject matter of Example 17 or 18, and optionally, wherein the first wireless station is configured to switch to the power save mode after receipt of an acknowledgement of the frame.

Example 20 includes the subject matter of any one of Examples 17-19, and optionally, wherein the frame comprises an awake window (AW) element to indicate the awake window.

Example 21 includes the subject matter of any one of Examples 17-20, and optionally, wherein the first wireless station is configured to determine the awake window according to an awake window (AW) element received in a beacon.

Example 22 includes the subject matter of any one of Examples 17-21, and optionally, wherein the first wireless station is configured to assert an end of service period (EOSP) indication in a transmission to the second wireless station during the second beacon interval, and to return to the low power mode.

Example 23 includes the subject matter of any one of Examples 17-22, and optionally, wherein the first wireless station is configured to transmit during the second beacon interval another frame comprising an indication that the first wireless station is to switch to the active mode, and to switch to the active mode.

Example 24 includes the subject matter of any one of Examples 17-23, and optionally, wherein the first wireless station is configured to operate at the low power mode during a third beacon interval subsequent to the second beacon interval.

Example 25 includes the subject matter of any one of Examples 17-24, and optionally, wherein the indication that the first wireless station is to switch to the low power mode comprises a power management bit having a value of one.

Example 26 includes the subject matter of any one of Examples 17-25, and optionally, wherein the first wireless station is a Direct Multi Gigabit (DMG) station (STA).

Example 27 includes the subject matter of any one of Examples 17-26, and optionally, wherein the first wireless station is a non Personal Basic Service Set (PBSS) Control Point (PCP) and non Access Point (AP) (non-PCP/AP) station (STA).

Example 28 includes the subject matter of Example 27, and optionally, wherein the second wireless station is a PCP or AP (PCP/AP) station (STA).

Example 29 includes the subject matter of Example 27, and optionally, wherein the second wireless station is a non-PCP/AP STA.

Example 30 includes the subject matter of any one of Examples 17-26, and optionally, wherein the first wireless station is a Personal Basic Service Set (PBSS) Control Point (PCP) station (STA).

Example 31 includes a method to be performed at a first wireless station, the method comprising transmitting a frame to a second wireless station during a first beacon interval, the frame comprising an indication that the first wireless station is to switch to a low power mode; switching to the low power mode; operating at an active mode during an awake window in a second beacon interval subsequent to the first beacon interval; and upon receipt of an announcement traffic indication message (ATIM) from the second wireless station during the awake window, transmitting an acknowledgement to the second wireless station, and staying at the active mode to communicate data with the second wireless station.

Example 32 includes the subject matter of Example 31, and optionally, comprising returning to the low power mode after the awake window for a remainder of the second beacon interval, if no ATIM is received by the first wireless station during the awake window.

Example 33 includes the subject matter of Example 31 or 32, and optionally, comprising switching to the power save mode after receipt of an acknowledgement of the frame.

Example 34 includes the subject matter of any one of Examples 31-33, and optionally, wherein the frame comprises an awake window (AW) element to indicate the awake window.

Example 35 includes the subject matter of any one of Examples 31-34, and optionally, comprising determining the awake window according to an awake window (AW) element received in a beacon.

Example 36 includes the subject matter of any one of Examples 31-35, and optionally, comprising asserting an end of service period (EOSP) indication in a transmission to the second wireless station during the second beacon interval, and returning to the low power mode.

Example 37 includes the subject matter of any one of Examples 31-36, and optionally, comprising transmitting during the second beacon interval another frame comprising an indication that the first wireless station is to switch to the active mode, and switching to the active mode.

Example 38 includes the subject matter of any one of Examples 31-37, and optionally, comprising operating at the low power mode during a third beacon interval subsequent to the second beacon interval.

Example 39 includes the subject matter of any one of Examples 31-38, and optionally, wherein the indication that the first wireless station is to switch to the low power mode comprises a power management bit having a value of one.

Example 40 includes the subject matter of any one of Examples 31-39, and optionally, wherein the first wireless station is a Direct Multi Gigabit (DMG) station (STA).

Example 41 includes the subject matter of any one of Examples 31-40, and optionally, wherein the first wireless station is a non Personal Basic Service Set (PBSS) Control Point (PCP) and non Access Point (AP) (non-PCP/AP) station (STA).

Example 42 includes the subject matter of Example 41, and optionally, wherein the second wireless station is a PCP or AP (PCP/AP) station (STA).

Example 43 includes the subject matter of Example 41, and optionally, wherein the second wireless station is a non-PCP/AP STA.

Example 44 includes the subject matter of any one of Examples 31-40, and optionally, wherein the first wireless station is a Personal Basic Service Set (PBSS) Control Point (PCP) station (STA).

Example 45 includes a product comprising one or more tangible computer-readable non-transitory storage media comprising computer-executable instructions operable to, when executed by at least one computer processor, enable the at least one computer processor to implement one or more operations at a first wireless station, the operations comprising transmitting a frame to a second wireless station during a first beacon interval, the frame comprising an indication that the first wireless station is to switch to a low power mode; switching to the low power mode; operating at an active mode during an awake window in a second beacon interval subsequent to the first beacon interval; and upon receipt of an announcement traffic indication message (ATIM) from the second wireless station during the awake window, transmitting an acknowledgement to the second wireless station, and staying at the active mode to communicate data with the second wireless station.

Example 46 includes the subject matter of Example 45, and optionally, wherein the operations comprise returning to the low power mode after the awake window for a remainder of the second beacon interval, if no ATIM is received by the first wireless station during the awake window.

Example 47 includes the subject matter of Example 45 or 46, and optionally, wherein the operations comprise switching to the power save mode after receipt of an acknowledgement of the frame.

Example 48 includes the subject matter of any one of Examples 45-47, and optionally, wherein the frame comprises an awake window (AW) element to indicate the awake window.

Example 49 includes the subject matter of any one of Examples 45-48, and optionally, wherein the operations comprise determining the awake window according to an awake window (AW) element received in a beacon.

Example 50 includes the subject matter of any one of Examples 45-49, and optionally, wherein the operations comprise asserting an end of service period (EOSP) indication in a transmission to the second wireless station during the second beacon interval, and returning to the low power mode.

Example 51 includes the subject matter of any one of Examples 45-50, and optionally, wherein the operations comprise transmitting during the second beacon interval another frame comprising an indication that the first wireless station is to switch to the active mode, and switching to the active mode.

Example 52 includes the subject matter of any one of Examples 45-51, and optionally, wherein the operations comprise operating at the low power mode during a third beacon interval subsequent to the second beacon interval.

Example 53 includes the subject matter of any one of Examples 45-52, and optionally, wherein the indication that the first wireless station is to switch to the low power mode comprises a power management bit having a value of one.

Example 54 includes the subject matter of any one of Examples 45-53, and optionally, wherein the first wireless station is a Direct Multi Gigabit (DMG) station (STA).

Example 55 includes the subject matter of any one of Examples 45-54, and optionally, wherein the first wireless station is a non Personal Basic Service Set (PBSS) Control Point (PCP) and non Access Point (AP) (non-PCP/AP) station (STA).

Example 56 includes the subject matter of Example 55, and optionally, wherein the second wireless station is a PCP or AP (PCP/AP) station (STA).

Example 57 includes the subject matter of Example 55, and optionally, wherein the second wireless station is a non-PCP/AP STA.

Example 58 includes the subject matter of any one of Examples 45-54, and optionally, wherein the first wireless station is a Personal Basic Service Set (PBSS) Control Point (PCP) station (STA).

Example 59 includes an apparatus of wireless communication by a first wireless station, the apparatus comprising means for transmitting a frame to a second wireless station during a first beacon interval, the frame comprising an indication that the first wireless station is to switch to a low power mode; means for switching to the low power mode; means for operating at an active mode during an awake window in a second beacon interval subsequent to the first beacon interval; and means for, upon receipt of an announcement traffic indication message (ATIM) from the second wireless station during the awake window, transmitting an acknowledgement to the second wireless station, and staying at the active mode to communicate data with the second wireless station.

Example 60 includes the subject matter of Example 59, and optionally, comprising means for returning to the low power mode after the awake window for a remainder of the second beacon interval, if no ATIM is received by the first wireless station during the awake window.

Example 61 includes the subject matter of Example 59 or 60, and optionally, comprising means for switching to the power save mode after receipt of an acknowledgement of the frame.

Example 62 includes the subject matter of any one of Examples 59-61, and optionally, wherein the frame comprises an awake window (AW) element to indicate the awake window.

Example 63 includes the subject matter of any one of Examples 59-62, and optionally, comprising means for determining the awake window according to an awake window (AW) element received in a beacon.

Example 64 includes the subject matter of any one of Examples 59-63, and optionally, comprising means for asserting an end of service period (EOSP) indication in a transmission to the second wireless station during the second beacon interval, and returning to the low power mode.

Example 65 includes the subject matter of any one of Examples 59-64, and optionally, comprising means for transmitting during the second beacon interval another frame comprising an indication that the first wireless station is to switch to the active mode, and switching to the active mode.

Example 66 includes the subject matter of any one of Examples 59-65, and optionally, comprising means for operating at the low power mode during a third beacon interval subsequent to the second beacon interval.

Example 67 includes the subject matter of any one of Examples 59-66, and optionally, wherein the indication that the first wireless station is to switch to the low power mode comprises a power management bit having a value of one.

Example 68 includes the subject matter of any one of Examples 59-67, and optionally, wherein the first wireless station is a Direct Multi Gigabit (DMG) station (STA).

Example 69 includes the subject matter of any one of Examples 59-68, and optionally, wherein the first wireless station is a non Personal Basic Service Set (PBSS) Control Point (PCP) and non Access Point (AP) (non-PCP/AP) station (STA).

Example 70 includes the subject matter of Example 69, and optionally, wherein the second wireless station is a PCP or AP (PCP/AP) station (STA).

Example 71 includes the subject matter of Example 69, and optionally, wherein the second wireless station is a non-PCP/AP STA.

Example 72 includes the subject matter of any one of Examples 59-68, and optionally, wherein the first wireless station is a Personal Basic Service Set (PBSS) Control Point (PCP) station (STA).

Example 73 includes an apparatus comprising circuitry configured to cause a first wireless station to process a frame received from a second wireless station during a first beacon interval, the frame comprising an indication that the second wireless station is to switch to a low power mode; transmit an announcement traffic indication message (ATIM) to the second wireless station during an awake window in a second beacon interval subsequent to the first beacon interval, the ATIM to indicate data is pending for the second wireless station; and upon receipt of an acknowledgement from the second wireless station, transmit one or more data frames to the second wireless station after the awake window and during the second beacon interval.

Example 74 includes the subject matter of Example 73, and optionally, wherein the frame comprises an awake window (AW) element to indicate the awake window.

Example 75 includes the subject matter of Example 73 or 74, and optionally, wherein the apparatus is configured to cause the first wireless station to send a beacon comprising an awake window (AW) element to indicate the awake window.

Example 76 includes the subject matter of any one of Examples 73-75, and optionally, wherein the apparatus is configured to cause the first wireless station to include the AW element in the beacon based on the indication that the second wireless station is to switch to the low power mode.

Example 77 includes the subject matter of any one of Examples 73-76, and optionally, wherein the apparatus is configured to cause the first wireless station to process a transmission received from the second wireless station during the second beacon interval and comprising an end of service period (EOSP) indication to indicate the second wireless station is to return to the low power mode.

Example 78 includes the subject matter of any one of Examples 73-77, and optionally, wherein the apparatus is configured to, upon receipt of a transmission from the second wireless station during the second beacon interval indicating that the second wireless station is to switch to the active mode, allow the first wireless station to transmit data to the second wireless station during a third beacon interval subsequent to the second beacon interval, without sending an ATIM to the second wireless station.

Example 79 includes the subject matter of any one of Examples 73-78, and optionally, wherein the first wireless station is a Direct Multi Gigabit (DMG) station (STA).

Example 80 includes the subject matter of any one of Examples 73-79, and optionally, wherein the first wireless station is a non Personal Basic Service Set (PBSS) Control Point (PCP) and non Access Point (AP) (non-PCP/AP) station (STA).

Example 81 includes the subject matter of Example 80, and optionally, wherein the second wireless station is a non-PCP/AP STA.

Example 82 includes the subject matter of any one of Examples 73-79, and optionally, wherein the first wireless station is a Personal Basic Service Set (PBSS) Control Point (PCP) or Access Point (AP) (PCP/AP) station (STA).

Example 83 includes the subject matter of Example 82, and optionally, wherein the second wireless station is a non-PCP/AP STA.

Example 84 includes the subject matter of any one of Examples 73-83, and optionally, comprising a receiver to receive the frame, and a transmitter to transmit the ATIM and the one or more data frames.

Example 85 includes the subject matter of any one of Examples 73-84, and optionally, comprising one or more antennas, a processor, and a memory.

Example 86 includes a system of wireless communication comprising a first wireless station, the first wireless station comprising one or more antennas; a processor; a memory; and a radio to process a frame received from a second wireless station during a first beacon interval, the frame comprising an indication that the second wireless station is to switch to a low power mode, to transmit an announcement traffic indication message (ATIM) to the second wireless station during an awake window in a second beacon interval subsequent to the first beacon interval, the ATIM to indicate data is pending for the second wireless station, and, upon receipt of an acknowledgement from the second wireless station, to transmit one or more data frames to the second wireless station after the awake window and during the second beacon interval.

Example 87 includes the subject matter of Example 86, and optionally, wherein the frame comprises an awake window (AW) element to indicate the awake window.

Example 88 includes the subject matter of Example 86 or 87, and optionally, wherein the first wireless station is configured to send a beacon comprising an awake window (AW) element to indicate the awake window.

Example 89 includes the subject matter of any one of Examples 86-88, and optionally, wherein the first wireless station is configured to include the AW element in the beacon based on the indication that the second wireless station is to switch to the low power mode.

Example 90 includes the subject matter of any one of Examples 86-89, and optionally, wherein the first wireless station is configured to process a transmission received from the second wireless station during the second beacon interval and comprising an end of service period (EOSP) indication to indicate the second wireless station is to return to the low power mode.

Example 91 includes the subject matter of any one of Examples 86-90, and optionally, wherein, upon receipt of a transmission from the second wireless station during the second beacon interval indicating that the second wireless station is to switch to the active mode, the first wireless station is configured to transmit data to the second wireless station during a third beacon interval subsequent to the second beacon interval, without sending an ATIM to the second wireless station.

Example 92 includes the subject matter of any one of Examples 86-91, and optionally, wherein the first wireless station is a Direct Multi Gigabit (DMG) station (STA).

Example 93 includes the subject matter of any one of Examples 86-92, and optionally, wherein the first wireless station is a non Personal Basic Service Set (PBSS) Control Point (PCP) and non Access Point (AP) (non-PCP/AP) station (STA).

Example 94 includes the subject matter of Example 93, and optionally, wherein the second wireless station is a non-PCP/AP STA.

Example 95 includes the subject matter of any one of Examples 86-92, and optionally, wherein the first wireless station is a Personal Basic Service Set (PBSS) Control Point (PCP) or Access Point (AP) (PCP/AP) station (STA).

Example 96 includes the subject matter of Example 95, and optionally, wherein the second wireless station is a non-PCP/AP STA.

Example 97 includes a method to be performed at a first wireless station, the method comprising processing a frame received from a second wireless station during a first beacon interval, the frame comprising an indication that the second wireless station is to switch to a low power mode; transmitting an announcement traffic indication message (ATIM) to the second wireless station during an awake window in a second beacon interval subsequent to the first beacon interval, the ATIM to indicate data is pending for the second wireless station; and upon receipt of an acknowledgement from the second wireless station, transmitting one or more data frames to the second wireless station after the awake window and during the second beacon interval.

Example 98 includes the subject matter of Example 97, and optionally, wherein the frame comprises an awake window (AW) element to indicate the awake window.

Example 99 includes the subject matter of Example 97 or 98, and optionally, comprising sending a beacon comprising an awake window (AW) element to indicate the awake window.

Example 100 includes the subject matter of any one of Examples 97-99, and optionally, comprising including the AW element in the beacon based on the indication that the second wireless station is to switch to the low power mode.

Example 101 includes the subject matter of any one of Examples 97-100, and optionally, comprising processing a transmission received from the second wireless station during the second beacon interval and comprising an end of service period (EOSP) indication to indicate the second wireless station is to return to the low power mode.

Example 102 includes the subject matter of any one of Examples 97-101, and optionally, comprising, upon receipt of a transmission from the second wireless station during the second beacon interval indicating that the second wireless station is to switch to the active mode, transmitting data to the second wireless station during a third beacon interval subsequent to the second beacon interval, without sending an ATIM to the second wireless station.

Example 103 includes the subject matter of any one of Examples 97-102, and optionally, wherein the first wireless station is a Direct Multi Gigabit (DMG) station (STA).

Example 104 includes the subject matter of any one of Examples 97-103, and optionally, wherein the first wireless station is a non Personal Basic Service Set (PBSS) Control Point (PCP) and non Access Point (AP) (non-PCP/AP) station (STA).

Example 105 includes the subject matter of Example 104, and optionally, wherein the second wireless station is a non-PCP/AP STA.

Example 106 includes the subject matter of any one of Examples 97-103, and optionally, wherein the first wireless station is a Personal Basic Service Set (PBSS) Control Point (PCP) or Access Point (AP) (PCP/AP) station (STA).

Example 107 includes the subject matter of Example 106, and optionally, wherein the second wireless station is a non-PCP/AP STA.

Example 108 includes a product comprising one or more tangible computer-readable non-transitory storage media comprising computer-executable instructions operable to, when executed by at least one computer processor, enable the at least one computer processor to implement one or more operations at a first wireless station, the operations comprising processing a frame received from a second wireless station during a first beacon interval, the frame comprising an indication that the second wireless station is to switch to a low power mode; transmitting an announcement traffic indication message (ATIM) to the second wireless station during an awake window in a second beacon interval subsequent to the first beacon interval, the ATIM to indicate data is pending for the second wireless station; and upon receipt of an acknowledgement from the second wireless station, transmitting one or more data frames to the second wireless station after the awake window and during the second beacon interval.

Example 109 includes the subject matter of Example 108, and optionally, wherein the frame comprises an awake window (AW) element to indicate the awake window.

Example 110 includes the subject matter of Example 108 or 109, and optionally, wherein the operations comprise sending a beacon comprising an awake window (AW) element to indicate the awake window.

Example 111 includes the subject matter of any one of Examples 108-110, and optionally, wherein the operations comprise including the AW element in the beacon based on the indication that the second wireless station is to switch to the low power mode.

Example 112 includes the subject matter of any one of Examples 108-111, and optionally, wherein the operations comprise processing a transmission received from the second wireless station during the second beacon interval and comprising an end of service period (EOSP) indication to indicate the second wireless station is to return to the low power mode.

Example 113 includes the subject matter of any one of Examples 108-112, and optionally, wherein the operations comprise, upon receipt of a transmission from the second wireless station during the second beacon interval indicating that the second wireless station is to switch to the active mode, transmitting data to the second wireless station during a third beacon interval subsequent to the second beacon interval, without sending an ATIM to the second wireless station.

Example 114 includes the subject matter of any one of Examples 108-113, and optionally, wherein the first wireless station is a Direct Multi Gigabit (DMG) station (STA).

Example 115 includes the subject matter of any one of Examples 108-114, and optionally, wherein the first wireless station is a non Personal Basic Service Set (PBSS) Control Point (PCP) and non Access Point (AP) (non-PCP/AP) station (STA).

Example 116 includes the subject matter of Example 115, and optionally, wherein the second wireless station is a non-PCP/AP STA.

Example 117 includes the subject matter of any one of Examples 108-114, and optionally, wherein the first wireless station is a Personal Basic Service Set (PBSS) Control Point (PCP) or Access Point (AP) (PCP/AP) station (STA).

Example 118 includes the subject matter of Example 117, and optionally, wherein the second wireless station is a non-PCP/AP STA.

Example 119 includes an apparatus of wireless communication by a first wireless station, the apparatus comprising means for processing a frame received from a second wireless station during a first beacon interval, the frame comprising an indication that the second wireless station is to switch to a low power mode; means for transmitting an announcement traffic indication message (ATIM) to the second wireless station during an awake window in a second beacon interval subsequent to the first beacon interval, the ATIM to indicate data is pending for the second wireless station; and means for, upon receipt of an acknowledgement from the second wireless station, transmitting one or more data frames to the second wireless station after the awake window and during the second beacon interval.

Example 120 includes the subject matter of Example 119, and optionally, wherein the frame comprises an awake window (AW) element to indicate the awake window.

Example 121 includes the subject matter of Example 119 or 120, and optionally, comprising means for sending a beacon comprising an awake window (AW) element to indicate the awake window.

Example 122 includes the subject matter of any one of Examples 119-121, and optionally, comprising means for including the AW element in the beacon based on the indication that the second wireless station is to switch to the low power mode.

Example 123 includes the subject matter of any one of Examples 119-122, and optionally, comprising means for processing a transmission received from the second wireless station during the second beacon interval and comprising an end of service period (EOSP) indication to indicate the second wireless station is to return to the low power mode.

Example 124 includes the subject matter of any one of Examples 119-123, and optionally, comprising means for, upon receipt of a transmission from the second wireless station during the second beacon interval indicating that the second wireless station is to switch to the active mode, transmitting data to the second wireless station during a third beacon interval subsequent to the second beacon interval, without sending an ATIM to the second wireless station.

Example 125 includes the subject matter of any one of Examples 119-124, and optionally, wherein the first wireless station is a Direct Multi Gigabit (DMG) station (STA).

Example 126 includes the subject matter of any one of Examples 119-125, and optionally, wherein the first wireless station is a non Personal Basic Service Set (PBSS) Control Point (PCP) and non Access Point (AP) (non-PCP/AP) station (STA).

Example 127 includes the subject matter of Example 126, and optionally, wherein the second wireless station is a non-PCP/AP STA.

Example 128 includes the subject matter of any one of Examples 119-125, and optionally, wherein the first wireless station is a Personal Basic Service Set (PBSS) Control Point (PCP) or Access Point (AP) (PCP/AP) station (STA).

Example 129 includes the subject matter of Example 128, and optionally, wherein the second wireless station is a non-PCP/AP STA.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising circuitry configured to cause a first wireless station to:
transmit a frame to a second wireless station during a first beacon interval, the frame comprising an indication that the first wireless station is to switch to a low power mode;
switch to the low power mode;
operate at an active mode during an awake window in a second beacon interval subsequent to the first beacon interval; and
upon receipt of an announcement traffic indication message (ATIM) from the second wireless station during the awake window, transmit an acknowledgement to the second wireless station, and stay at the active mode to communicate data with the second wireless station; and
transmit during the second beacon interval another frame comprising an indication that the first wireless station is to switch to the active mode, and switch to the active mode.

2. The apparatus of claim 1 configured to cause the first wireless station to return to the low power mode after the awake window for a remainder of the second beacon interval, if no ATIM is received by the first wireless station during the awake window.

3. The apparatus of claim 1 configured to cause the first wireless station to switch to the power save mode after receipt of an acknowledgement of the frame.

4. The apparatus of claim 1, wherein the frame comprises an awake window (AW) element to indicate the awake window.

5. The apparatus of claim 1 configured to cause the first wireless station to determine the awake window according to an awake window (AW) element received in a beacon.

6. The apparatus of claim 1 configured to cause the first wireless station to assert an end of service period (EOSP) indication in a transmission to the second wireless station during the second beacon interval, and to return to the low power mode.

7. An apparatus comprising circuitry configured to cause a Personal Basic Service Set (PBSS) Control Point (PCP) station (STA) to:
transmit a frame to a wireless station during a first beacon interval, the frame comprising an indication that the PCP STA is to switch to a low power mode;
switch to the low power mode;
operate at an active mode during an awake window in a second beacon interval subsequent to the first beacon interval; and
upon receipt of an announcement traffic indication message (ATIM) from the wireless station during the awake window, transmit an acknowledgement to the wireless station, and stay at the active mode to communicate data with the wireless station.

8. The apparatus of claim 1 configured to cause the first wireless station to operate at the low power mode during a third beacon interval subsequent to the second beacon interval.

9. The apparatus of claim 1, wherein the indication that the first wireless station is to switch to the low power mode comprises a power management bit having a value of one.

10. The apparatus of claim 1, wherein the first wireless station is a Direct Multi Gigabit (DMG) station (STA).

11. The apparatus of claim 1, wherein the first wireless station is a non Personal Basic Service Set (PBSS) Control Point (PCP) and non Access Point (AP) (non-PCP/AP) station (STA).

12. The apparatus of claim 1 comprising a transmitter to transmit said frame and said another frame, and a receiver to receive said ATIM.

13. The apparatus of claim 1 comprising one or more antennas, a processor, and a memory.

14. The apparatus of claim 7 configured to cause the PCP STA to return to the low power mode after the awake window for a remainder of the second beacon interval, if no ATIM is received by the PCP STA during the awake window.

15. A product comprising one or more tangible computer-readable non-transitory storage media comprising computer-executable instructions operable to, when executed by at least one processor, enable the at least one processor to cause a first wireless station to:
transmit a frame to a second wireless station during a first beacon interval, the frame comprising an indication that the first wireless station is to switch to a low power mode;
switch to the low power mode;
operate at an active mode during an awake window in a second beacon interval subsequent to the first beacon interval;
upon receipt of an announcement traffic indication message (ATIM) from the second wireless station during the awake window, transmit an acknowledgement to the second wireless station, and stay at the active mode to communicate data with the second wireless station; and
transmit during the second beacon interval another frame comprising an indication that the first wireless station is to switch to the active mode, and switch to the active mode.

16. The product of claim 15, wherein the instructions, when executed, cause the first wireless station to return to the low power mode after the awake window for a remainder of the second beacon interval, if no ATIM is received by the first wireless station during the awake window.

17. The product of claim 15, wherein the frame comprises an awake window (AW) element to indicate the awake window.

* * * * *

UNITED STATES PATENT AND TRADEMARK OFFICE
CERTIFICATE OF CORRECTION

PATENT NO. : 9,924,457 B2  
APPLICATION NO. : 14/864963  
DATED : March 20, 2018  
INVENTOR(S) : Trainin et al.

Page 1 of 1

It is certified that error appears in the above-identified patent and that said Letters Patent is hereby corrected as shown below:

In the Claims

In Column 33, Line 19, in Claim 1, delete "interval; and" and insert --interval;--, therefor.

Signed and Sealed this  
Twenty-eighth Day of August, 2018

Andrei Iancu  
*Director of the United States Patent and Trademark Office*